Patented Sept. 7, 1948

2,448,739

UNITED STATES PATENT OFFICE 2,448,739

BROMINATION OF UNSATURATED ORGANIC COMPOUNDS

John Ross, Ramsey, N. J., assignor to Colgate-Palmolive-Peet Company, Jersey City, N. J., a corporation of Delaware No Drawing. Application April 15, 1942, Serial No. 439,085

9 Claims. (Cl. 260—660)

The present invention relates to a novel process for preparing organic compounds and, more particularly, to a new method for adding bromine to unsaturated organic bodies.

It has long been known that bromine can be added to unsaturated organic compounds by contacting the bromine with the compound to be reacted, but direct contact of the reactants often does not lend itself to such control of reaction conditions, including temperatures, as are frequently desirable for obtaining a particular product in satisfactory yield and purity. Another method employed is to dissolve bromine in carbon bisulphide and to add the unsaturated compound thereto. While this method has the advantage of providing a solvent for intimate contact of the bromine with the other reactant and for improved control of reaction conditions, it also has the disadvantages that it is generally necessary to use an ice bath for temperature control and that great caution must be exercised to avoid fire hazards when employing so highly flammable a solvent. Other solvents have also been suggested as advantageous for controlling these processes, but concomitant disadvantages in their use have greatly limited their value. Thus, some solvents have tended to enter into the reaction, further complicating the desired process, and a common objection has been the difficulty of removing the solvents from the product after completion of the reaction. All of these prior art methods have the additional disadvantage that it is generally very difficult to avoid side reactions resulting in relatively poor yields and low quality of desired products.

It is an object of the present invention to provide a new method for rapidly adding bromine to organic compounds to obtain good yields of the bromine-containing products of high purity.

It is another object of the invention to provide a novel process for adding bromine to unsaturated organic bodies in an inert, low-boiling, non-inflammable solvent.

Other objects and advantages of the invention will be apparent from the following description.

According to the present invention, bromine is contacted with an unsaturated organic compound in an inert, non-aqueous, polar medium, such as liquid sulphur dioxide, for a relatively short time. After the addition of the bromine, the liquid sulphur dioxide is removed, and the bromine-containing product is recovered.

The process of the invention is applicable for the addition of bromine to organic unsaturated compounds, particularly those of the olefinic and acetylenic types, although certain aromatic compounds (for example, benzene) also form bromine addition products by this method. The compounds which may be thus reacted include unsaturated aliphatic hydrocarbons, acids, alcohols, aldehydes, ethers, ketones and the like, as well as derivatives of these compounds, including sulphonated, nitrated, halogenated or aryl-substituted bodies, etc., and the like. Compounds satisfactory for addition of bromine by the present process include propylene, decene-1, 5-chlorpentene-2, crotonylene, isoprene, diallyl (hexadiene-1,5), allyl bromide, heptyne-1, styrene, vinyl acetylene, dehydro-undecylenic acid, beta-ethylacrylic acid, sorbic acid, linoleic acid, maleic anhydride, cinnamic acid, cyclopentadiene, allyl carbinol, citronellol, 1-nitroisobutylene-2, acrolein, propargylic aldehyde, crotyl ethyl ether, vinyl propyl ketone, mesityl oxide, phorone, indene, etc. The process of this invention is thus applicable for adding bromine to any unsaturated organic compound capable of adding bromine at similar temperatures.

A convenient way of contacting unsaturated organic compounds with bromine is to dissolve the organic compound in liquid sulphur dioxide and then to add bromine dropwise to the solution while agitating. If desired, the bromine may be dissolved in liquid sulphur dioxide and/or in an organic solvent before addition to the liquid sulphur dioxide solution of the organic compound. Bromine is very readily soluble in liquid sulphur dioxide, and contact with unsaturated compounds may also be effected therein by first dissolving the bromine in liquid sulphur dioxide and then running the organic compound, if liquid, into the sulphur dioxide solution of bromine while agitating. If the organic compound is gaseous, it may be bubbled through the sulphur dioxide solution of bromine. The organic compound, if solid, may be added directly to the liquid sulphur dioxide solution of bromine and may be dissolved or suspended therein, or it may be liquefied prior to admixture by the use of heat and/or of solvents. However, it will be understood from the foregoing that the mixture may also be made by running the sulphur dioxide solution of bromine into the organic compound to which bromine is to be added, or the two bodies may be admixed in concurrent streams or may be passed in countercurrent to each other in continuous operation. Such countercurrent contact is of particular convenience where the organic unsaturated compound is gaseous and can be bubbled upward through a downwardly moving column of the sulphur dioxide solution of bromine. In contacting bromine with liquid sulphur dioxide, it is preferable to provide substantially anhydrous conditions in order to avoid side reactions due to formation of hydrogen bromide.

The organic reactants may advantageously be dissolved in another inert solvent for admixture with the sulphur dioxide solution of bromine, especially where the reactant is insoluble or only slightly soluble in liquid sulphur dioxide. The reaction mixture may thus be of either one or two liquid phases, and it is preferred that the solvent selected be at least partly miscible with liquid sulphur dioxide. Suitable solvents or suspending media for the unsaturated organic reactant include butane, pentane, hexane, decane and other alkanes; carbon tetrachloride, chloroform, ethylene dichloride, ethyl bromide, dichloro- difluoro-methane, and other halogenated hydrocarbons; cyclohexane, decalin, tetralin, and other cycloaliphatics; acetic acid; petroleum ether and gasoline, and the like, and any mixtures thereof with each other and/or with liquid sulphur dioxide.

The contact in liquid sulphur dioxide of the organic reactant and the bromine is preferably aided by agitation, especially where more than one phase is present. The time of contact varies appreciably, depending upon the compound to be reacted, but it has been observed that high yields are obtainable with most reactants after about fifteen to about thirty minutes, and in some cases in even shorter times. Similarly, the proportions of the organic reactant to the bromine may vary widely, especially for different degrees of bromine addition where poly-unsaturated or acetylenic groups are reacted. The reaction temperatures and pressures may also be varied within wide limits, again depending upon the compound to be reacted and the product to be formed. In general, it is preferred to carry out the reaction at temperatures around $-10°$ C. or below and at atmospheric pressure, although temperatures from about $-40°$ to about $70°$ C. or even higher, but below the critical temperature of sulphur dioxide, may be used. Likewise, either superatmospheric or reduced pressures may also be employed, the former being preferred when higher temperatures are used in order to keep the sulphur dioxide in the liquid state. When the operation is carried out at temperatures and pressures and/or under other conditions which remove substantial amounts of the sulphur dioxide through volatilization or otherwise, it is desirable to provide for the addition of sufficient liquid sulphur dioxide to the reaction mixture in order that the volume may be appropriately adjusted. In this manner, by regulation of the pressure, control of temperatures can be obtained.

After the reaction has progressed to the desired degree, the sulphur dioxide is removed from the reaction mixture. This may be accomplished by bubbling an inert gas, such as carbon dioxide, nitrogen, stack gases, etc., through the mixture, and/or by gradually pouring the mixture into ice water or upon ice, during which operation most of the liquid sulphur dioxide volatilizes, and/or by other means. Suitable equipment may be provided for carrying out these operations, whereby the volatility of the sulphur dioxide may be increased, as by reducing the pressure in the system. Such equipment may also be provided with condensers, whereby excess bromine, the volatilized sulphur dioxide and/or other solvents employed may be recovered for reuse. In many cases, the nature of the product formed is such that its temperature may be increased without deleterious effect, so that most or all of the remaining solvent and/or excess bromine may be removed from the reaction mixture by heating or the like. Known methods including fractional distillation, fractional crystallization, extraction, and other separation procedures or any combination of these, may be employed for separating the product from the aqueous mass and/or from unreacted materials.

The effect of oxidation upon olefines and other unsaturated bodies is a deleterious one for the present purpose, since, in the presence of peroxides, olefines and substituted olefines give polymeric sulphones with sulphur dioxide. It has therefore been found to be of advantage to use freshly prepared and/or freshly distilled olefinic and acetylenic compounds substantially free from peroxides and/or to add anti-oxidants to the mixture before reacting with bromine to form bromine addition products. Suitable anti-oxidants include stannous chloride, hydroquinone, pyrocatechin, decahydronaphthalene, etc.

The following examples are provided to illustrate the present invention, and it will be apparent that the invention is not limited thereto.

*Example I*

About 50 cc. of liquid sulphur dioxide is tapped from an inverted cylinder of sulphur dioxide into a cylindrical, unsilvered Dewar flask of about 1 liter capacity, open at the top, and provided with an electric stirrer. About 10.4 grams of freshly distilled styrene are dissolved in the liquid sulphur dioxide, and about 16 grams of bromine are added dropwise during a period of about ten to fifteen minutes. The mixture is continuously stirred during the addition, and the bromine is taken up as soon as added, the temperature being maintained at about $-8°$ C. After about five minutes of additional stirring, a current of dry carbon dioxide is passed through the reaction mixture to evaporate the sulphur dioxide. The residue is taken up with hot methanol and is recrystallized therefrom to form white, lustrous crystals having a melting point of about $73°$ C. The product is identified as alpha, beta-dibromoethyl benzene. A yield equivalent to the calculated theoretical yield is obtained. This high yield is apparently due to being able to maintain the reaction temperature at the low temperature of liquid sulphur dioxide and thus substantially to eliminate side reactions.

*Example II*

About 12 grams of freshly distilled allyl bromide are dissolved in about 100 cc. of sulphur dioxide, and the solution is brought to a temperature of about $15°$ C. and under a pressure of about 3 atmospheres. About 16 grams of bromine at about $15°$ C. are added dropwise to this solution while stirring and substantially maintaining the original temperature and pressure. Upon completion of the reaction, nitrogen gas is bubbled through the reaction mixture, which is then poured into ice water to volatilize the major portion of the sulphur dioxide. Thereafter, the entire mass is distilled to remove unreacted allyl bromide. The residue, boiling at about $218°$ to about $221°$ C., comprises glyceryl tribromide (1,2,3-tribromopropane).

*Example III*

About 56 grams of freshly distilled acrolein are dissolved in about 500 cc. of liquid sulphur dioxide in a Dewar flask, and about 160 grams of bromine are slowly added thereto. After about twenty minutes of stirring, the reaction is completed. The sulphur dioxide is removed from the reaction mixture, following the procedure set forth in Example I, and alpha, beta-dibromopropionaldehyde is recovered.

*Example IV*

About 16 grams of bromine are dissolved in about 100 cc. of liquid sulphur dioxide, and about 11.6 grams of indene are run into this solution, the mixture being mechanically agitated for about thirty minutes. At the end of this time, the temperature is gradually increased, and the sulphur dioxide is distilled off. The reaction mass is then extracted with carbon tetrachloride, the solvent is removed, and the product is further distilled in vacuo, 1,2-dibromindane (M. P. 30° C.) being obtained therefrom.

*Example V*

An anhydrous solution of about 80 parts by weight of bromine per hour dissolved in about 1,000 parts of liquid sulphur dioxide per hour are run slowly downward through a column. At a point above the lowest portion of the column, about 15 parts of gaseous ethylene per hour are passed into the column and are bubbled through the downwardly flowing solution. The reaction product is removed at the bottom of the column, together with liquid sulphur dioxide and unreacted ethylene dissolved therein, from which it is separated and recovered. Unreacted and undissolved gaseous ethylene and volatilized sulphur dioxide are withdrawn at the top of the column. The product comprises ethylene dibromide.

The use of liquid sulphur dioxide as a solvent medium for the reactants has many advantages in adding bromine to unsaturated compounds. Liquid sulphur dioxide is inexpensive, easily removable, non-corrosive and non-inflammable, has a low boiling-point and is an excellent solvent, especially for the lower olefines. Its use is of particular advantage in those cases where secondary reactions may take place at higher temperatures. Close control of reaction temperatures, ordinarily unattainable or attainable only with great difficulty, can be easily maintained in liquid sulphur dioxide, especially with regulation of pressure.

Although the present invention has been described with reference to particular embodiments and examples, it will be apparent to those skilled in the art that variations and modifications of this invention can be made and that equivalents can be substituted therefor without departing from the principles and true spirit of the invention. Such variations and modifications are believed to be within the scope of the present specification and within the purview of the appended claims.

I claim:

1. In the process of adding bromine to an unsaturated organic compound, the improvement which comprises intimately contacting said compound with bromine while at least one of said compound and said bromine is dissolved in liquid sulphur dioxide, the liquid sulphur dioxide being maintained during the addition reaction at a temperature at least as high as —40° C. but below the critical temperature of sulphur dioxide.

2. The improvement set forth in claim 1 wherein the unsaturated organic compound is freshly distilled.

3. The improvement set forth in claim 1 wherein the reactants are contacted in the presence of an anti-oxidant.

4. In a process of adding bromine to an organic compound having an unsaturated aliphatic group, the improvement which comprises preparing a solution of the organic compound in liquid sulphur dioxide, mixing bromine with said solution, maintaining the solution at a temperature at least as high as about —40° C. during the addition reaction, removing sulphur dioxide from said mixture to leave a residue, and recovering the addition product from said residue.

5. In a process of adding bromine to an organic compound having an unsaturated aliphatic group, the improvement which comprises preparing a solution of bromine in liquid sulphur dioxide, mixing said solution with said organic compound, maintaining the solution at a temperature at least as high as about —40° C. during the addition reaction, removing sulphur dioxide from said mixture to leave a residue, and recovering the addition product from said residue.

6. In a process of adding bromine to an organic compound having an unsaturated aliphatic group, the improvement which comprises preparing a solution of bromine in liquid sulphur dioxide as a solvent, dissolving said organic compound in a substantially inert solvent at least partially miscible with liquid sulphur dioxide to form a second solution, intimately mixing said solutions, maintaining the mixture of said solutions within the temperature range from about —40° C. to below the critical temperature of sulphur dioxide, removing said solvents comprising sulphur dioxide from said mixture to leave a residue, and recovering the addition product from said residue.

7. The process which comprises reacting an unsaturated organic compound in liquid sulphur dioxide with bromine to add to at least one unsaturated bond of a substantial number of the molecules of the organic compound two atoms of bromine, the temperature of the liquid sulphur dioxide during the addition reaction being at least as high as about —40° C.

8. The process which comprises reacting an aliphatic unsaturated organic compound in liquid sulphur dioxide with bromine whereby bromine is added to at least one unsaturated linkage of the organic compound, the temperature of the liquid sulphur dioxide during the addition reaction being at least as high as about —40° C.

9. The process which comprises reacting an olefine in liquid sulphur dioxide with bromine whereby bromine is added to at least one unsaturated bond of the olefine the temperature of the liquid sulphur dioxide during the addition reaction being at least as high as about —40° C., and removing the sulphur dioxide.

JOHN ROSS.

REFERENCES CITED

The following references are of record in the file of this patent:

UNITED STATES PATENTS

| Number | Name | Date |
|---|---|---|
| 554,974 | Baum | Feb. 18, 1896 |
| 631,608 | Bally | Aug. 22, 1899 |
| 1,231,123 | Brooks et al. | June 26, 1917 |
| 1,440,976 | Ellis et al. | Jan. 2, 1923 |
| 1,760,328 | Twiss | May 27, 1930 |

(Other references on following page)

| Number | Name | Date |
|---|---|---|
| 1,847,566 | Laschinger | Mar. 1, 1932 |
| 1,933,987 | Laska | Nov. 7, 1933 |
| 2,013,791 | Sachs | Sept. 10, 1935 |
| 2,046,090 | Reed | June 30, 1936 |
| 2,224,155 | Kennedy | Dec. 10, 1940 |
| 2,244,512 | Brandt | June 3, 1941 |

FOREIGN PATENTS

| Number | Country | Date |
|---|---|---|
| 298,944 | Germany | Dec. 12, 1919 |
| 381,070 | Great Britain | Sept. 29, 1932 |
| 481,515 | Great Britain | Mar. 11, 1938 |

OTHER REFERENCES

"Chemical Abstracts," vol. 17, page 748 (1923), abstract of an article by Meerwein et al.

Ibid., vol. 29, col. 2465 (1935), abstract of article by Cornog et al. in "Proc. Iowa Acad. Sci.," vol. 40, pages 97–98 (1933).

Smyth: "Dielectric Constant and Molecular Structure," (A. C. S. Monograph No. 55), pages 13, 191–93.